US011295619B2

(12) United States Patent
Peng et al.

(10) Patent No.: US 11,295,619 B2
(45) Date of Patent: Apr. 5, 2022

(54) PARKING LOT DATA REPAIR METHOD AND APPARATUS, DEVICE AND STORAGE MEDIUM

(71) Applicant: Shenzhen Institutes of Advanced Technology, Guangdong (CN)

(72) Inventors: Lei Peng, Guangdong (CN); Yuqiang Sun, Guangdong (CN); Huiyun Li, Guangdong (CN)

(73) Assignee: Shenzhen Institutes of Advanced Technology, Guangdong (CN)

( * ) Notice: Subject to any disclaimer, the term of this patent is extended or adjusted under 35 U.S.C. 154(b) by 0 days.

(21) Appl. No.: 17/121,141

(22) Filed: Dec. 14, 2020

(65) Prior Publication Data

US 2021/0125497 A1   Apr. 29, 2021

Related U.S. Application Data

(63) Continuation-in-part of application No. PCT/CN2018/092255, filed on Jun. 21, 2018.

(51) Int. Cl.
 *G08G 1/14* (2006.01)
 *G06F 16/75* (2019.01)
 (Continued)

(52) U.S. Cl.
 CPC ..................... *G08G 1/14* (2013.01)

(58) Field of Classification Search
 CPC ........................................ G08G 1/14
 See application file for complete search history.

(56) References Cited

U.S. PATENT DOCUMENTS

2014/0207725 A1   7/2014  Li et al.
2016/0247326 A1*  8/2016  de Souza ............... G06Q 10/04
(Continued)

FOREIGN PATENT DOCUMENTS

CN   105488346 A   4/2016
CN   106297383 A   1/2017
(Continued)

OTHER PUBLICATIONS

International Search Report dated Mar. 21, 2019 for PCT Patent Application No. PCT/CN2018/092255.
(Continued)

*Primary Examiner* — Joseph H Feild
*Assistant Examiner* — Pameshanand Mahase
(74) *Attorney, Agent, or Firm* — Lei Fang; Smith Tempel Blaha LLC

(57) ABSTRACT

A parking lot data repair method and apparatus, a device, and a storage medium. The method comprises: calculating spatial similarity between two parking lots according to the spatial features of the parking lots and a spatial similarity measurement model; clustering the parking lots into different parking lot clusters according to the spatial similarity, and calculating a spatial similarity probability corresponding to each parking lot cluster; calculating data similarity between two sample parking lots in the same parking lot cluster, and according to the data similarity and the spatial similarity probability corresponding to the parking lot cluster, calculating the data similarity probability of the parking lot cluster under a similar spatial condition; and when the data similarity probability under the similar spatial condition exceeds a probability threshold value, performing data repair on the parking lot to be repaired in the parking lot cluster by means of a cyclic generation-type confrontation network.

18 Claims, 4 Drawing Sheets

(51) Int. Cl.
*G06Q 50/30* (2012.01)
*G06G 1/14* (2006.01)
*G07B 15/02* (2011.01)

(56) References Cited

U.S. PATENT DOCUMENTS

2018/0102053 A1* 4/2018 Hillman ................. G08G 1/143
2018/0286239 A1* 10/2018 Kaloyeros .............. G08G 1/144
2020/0311849 A1* 10/2020 Noguchi ................ G06Q 50/30

FOREIGN PATENT DOCUMENTS

| CN | 106447082 A | 2/2017 |
| CN | 107146462 A | 9/2017 |

OTHER PUBLICATIONS

Written Opinion dated Mar. 21, 2019 for PCT Patent Application No. PCT/CN2018/092255.

* cited by examiner

PARKING LOT DATA REPAIR METHOD AND APPARATUS, DEVICE AND STORAGE MEDIUM

CROSS REFERENCE TO RELATED APPLICATIONS

This is continuation of International Patent Application No. PCT/CN2018/092255, filed on Jun. 21, 2018, the content of which is incorporated herein by reference in its entirety.

FIELD OF INVENTION

The invention belongs to the field of information technology, and particularly involves a data patching method, device, equipment and storage medium for parking lots.

BACKGROUND OF INVENTION

Due to the surge in the number of vehicles and the lack of long-term consideration of vehicle parking in the early planning for domestic cities, the number of parking spaces in hot spot areas in large and medium-sized cities in China is far fewer than that of vehicles entering parking lots, which causes unnecessary waste of time and energy and even traffic jams when vehicles are looking for parking spaces. It is difficult to increase the parking spaces in these areas in the short term, so it is important to improve the utilization rate of parking spaces in these areas.

To improve the utilization rate of parking spaces, it is necessary to push real-time parking information to vehicles in need to help them find parking spaces rapidly, namely, Parking Guidance and Information (PGIS) proposed by researchers. However, historical and real-time data of parking spaces in most urban parking lots are not recorded. The lack of such parking data results in the failure of PGIS to play the role of parking guidance. In addition, the establishment of a complete urban parking data network system in a short time requires high economic and time costs. The current best solution is to patch the data of parking lots to reduce the cost of providing data for PGIS.

At present, researches of traffic data patching mainly focus on the generation of dynamic traffic, namely traffic flow data generation, while there are few researches on static traffic data, namely parking data patching. Among the existing data modification schemes, the patching methods based on historical time series data are highly dependent on the prior knowledge of parking lots. When a parking lot lacks a lot of parking data or even has no data, data patching cannot be realized with the common interpolation method. The data modification method based on spatial characteristics can reduce the demand for prior knowledge of parking lots to some extent, but the choice of spatial dimension is often limited to the latitude and longitude information of geographic space. Due to low malleability of spatial characteristics, it is difficult to conduct accurate patching of urban parking data.

SUMMARY OF INVENTION

The invention provides a data patching method, device, equipment and storage medium for parking lots to solve the problems that the data patching method in the existing technology for parking lots relies on the prior knowledge of parking lots, and that the accuracy of data patching for parking lots is not high.

On the one hand, the invention provides a data patching method for parking lots, which comprises the following steps:

Obtaining a pre-collected collection of urban parking lots, calculating the spatial similarity between two parking lots according to the spatial characteristics and preset spatial similarity measurement model of each parking lot in the said collection of urban parking lots. The said parking lots comprise parking lots to be patched and sample parking lots;

Clustering the said parking lots into different clusters according to the spatial similarity between two parking lots, and calculating the corresponding spatial similarity probability of each parking lot cluster;

Calculating the data similarity between two sample parking lots in the same parking lot cluster, and calculating the data similarity probability of the said parking lot clusters under the similar spatial condition according to the data similarity between two sample parking lots and the spatial similarity probability corresponding to the said parking lot clusters;

Patching data of the parking lots to be patched in the said parking lot clusters according to the parking data of the said sample parking lots in the said parking lot clusters and the preset recurrent GANs when the data similarity probability under the similar spatial condition exceeds the probability threshold.

On the other hand, the invention provides a data patching device for parking lots, which comprises:

Spatial similarity computing unit is used to obtain a pre-collected collection of urban parking lots, calculate the spatial similarity between two parking lots according to the spatial characteristics and preset spatial similarity measurement model of each parking lot in the said collection of urban parking lots. The said parking lots comprise parking lots to be patched and sample parking lots;

Spatial similarity probability computing unit is used to cluster the said parking lots into different clusters according to the spatial similarity between two parking lots, and calculate the corresponding spatial similarity probability of each parking lot cluster;

Data similarity probability computing unit is used to calculate the data similarity between two sample parking lots in the same parking lot cluster, and calculate the data similarity probability of the said parking lot clusters under the similar spatial condition according to the data similarity between two sample parking lots and the spatial similarity probability corresponding to the said parking lot clusters; and Data patching unit is used to patch data of the parking lots to be patched in the said parking lot clusters according to the parking data of the said sample parking lots in the said parking lot clusters and the preset recurrent GANs when the data similarity probability under the similar spatial condition exceeds the probability threshold.

In addition, the invention also provides a kind of computing equipment, which comprises a memory, a processor, and a computer program stored in the memory and capable of running on the said processor, which executes the said computer program to implement said steps of the aforesaid data patching method for parking lots.

In addition, the invention also provides a computer readable storage medium, which stores a computer program, which is executed by the processor to implement the said steps of the aforesaid data patching method for parking lots.

The invention comprises the following steps: calculating the spatial similarity between two parking lots according to the spatial characteristics and preset spatial similarity measurement model of parking lots in the collection of urban parking lots, clustering parking lots into different clusters according to the spatial similarity, calculating the corresponding spatial similarity probability of parking lot clusters, calculating the data similarity between two sample parking lots in the same parking lot cluster, calculating the data similarity probability of the parking lot clusters under the similar spatial condition according to the data similarity and the spatial similarity probability corresponding to the parking lot clusters, patching data of the parking lots to be patched in parking lot clusters through recurrent GANs when the data similarity probability under the similar spatial condition exceeds the probability threshold, thus to conduct accurate data patching on parking lots to be patched without relying on the prior knowledge of the parking lots to be patched, which effectively saves the economic and time costs of setting up data acquisition equipment in parking lots to be patched.

DETAILED DESCRIPTION OF INVENTION

In order to make the objectives, technical solutions, and advantages of the present invention clearer, the present invention is further described in detail below with reference to the accompanying figures and embodiments. It should be appreciated that the specific embodiments described herein are merely illustrative of the present invention; it is not intended to limit the present invention.

The detailed description of the implementation of the invention made in accordance with embodiments is as follows:

Embodiment 1

Figure 1:
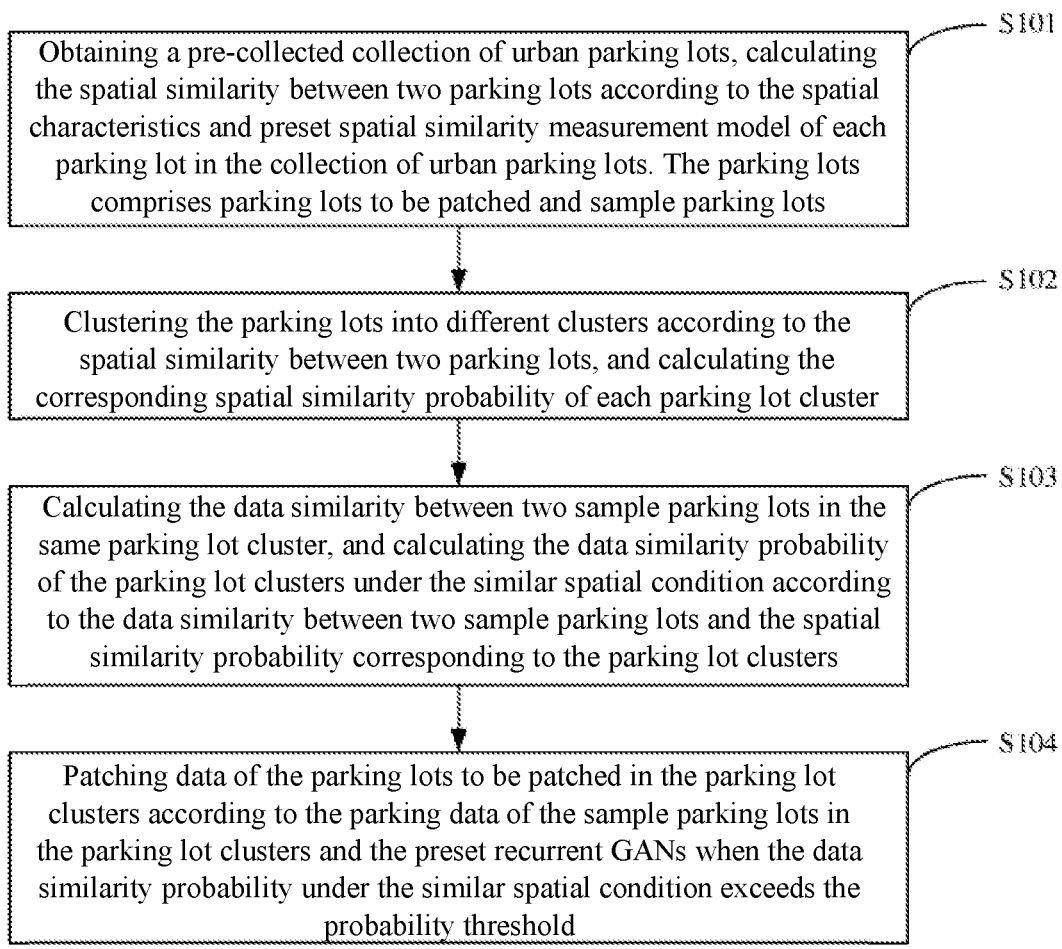
FIG. 1 is an implementation flow chart of the data patching method for parking lots provided in embodiment 1 of the invention.

FIG. 1 shows the implementation process of the data patching method for parking lots provided in embodiment 1 of the invention. For the convenience of illustration, only parts related to the embodiments of the invention are shown as follows:

In step S101, obtaining a pre-collected collection of urban parking lots, calculating the spatial similarity between two parking lots according to the spatial characteristics and preset spatial similarity measurement model of each parking lot in the collection of urban parking lots. The parking lots comprise parking lots to be patched and sample parking lots.

In the embodiment of the invention, the pre-collected collection of urban parking lots includes information about multiple parking lots and each parking lot. These parking lots include those without parking data and those with parking data. For the sake of distinction, the parking lots without parking data are called the parking lots to be patched, and those with parking data are called the sample parking lots. In the collection of urban parking lots, the relevant information of the parking lots to be patched includes the spatial characteristics of the parking lots to be patched, the relevant information of the sample parking lots includes the spatial characteristics and parking data of the sample parking lots, and the parking data are historical parking data.

In the embodiment of the invention, when collecting the collection of urban parking lots, the latitude and longitude of the geographic location of each parking lot and the number of each kind of preset geographic points of interest within the preset range of each parking lot in the collection of urban parking lots are collected. The spatial characteristics of a parking lot are composed of the latitude and longitude of its geographic location and the number of each kind of preset geographic points of interest within its preset range. Therefore, the subsequent calculation accuracy of spatial similarity between two parking lots can be effectively improved by considering the influence of geographical location and surrounding geographical points of interest on the parking lots. The latitude and longitude of a parking lot is a bivector. The number of each kind of preset geographic points of interest within the preset range of a parking lot constitutes the h-dimension vector. Therefore, the spatial characteristics of a parking lot is an h+2-dimensional vector. h is the number of kinds of geographical points of interest.

Preferably, the preset range of a parking lot is the area with the parking lot as the center and the preset tolerance radius as the radius, which can effectively improve the subsequent calculation accuracy of spatial similarity between two parking lots. The tolerance radius is the farthest distance between the parking lot and the destination that a driver can receive.

In the embodiment of the invention, the spatial similarity between two parking lots in the collection of urban parking lots according to the spatial characteristics and preset spatial similarity measurement model of each parking lot. Preferably, the spatial similarity measurement model is indicated as:

$$S_{spatial}(p_1, p_2) = \alpha \frac{\eta_1 \cdot \eta_2}{\|\eta_1\| \cdot \|\eta_2\|} + \beta \frac{\omega_1 \cdot \omega_2}{\|\omega_1\| \cdot \|\omega_2\|},$$

wherein, $S_{spatial}(p_1, p_1)$ is the spatial similarity between the parking lot $p_1$ and the parking lot $p_2$ in the collection of urban parking lots, the spatial characteristics of the parking lots $p_1$ and $p_2$ are $(\eta_1, \omega_1)$ and $(\eta_2, \omega_2)$ respectively, $\eta_1$ and $\omega_1$ are the latitude and longitude of the geographic location of the parking lot $p_1$ and the corresponding number of geographic points of interest respectively, $\eta_2$ and $\omega_2 p$ are the latitude and longitude of the geographic location of the parking lot $p_2$ and the corresponding number of geographic points of interest respectively, and $\alpha$ and $\beta$ are preset influence coefficients. Thus, the spatial similarity measurement model is integrated with the influence of the latitude and longitude of the parking lot and the surrounding geographical points of interest on the spatial similarity, which effectively improve the calculation accuracy of spatial similarity.

In step S102, clustering the parking lots into different clusters according to the spatial similarity between two parking lots, and calculating the corresponding spatial similarity probability of each parking lot cluster.

In the embodiment of the invention, after obtaining the spatial similarity between two parking lots, all parking lots in the collection of urban parking lots can be clustered into different clusters according to these spatial similarity values and the preset clustering algorithm (i.e. K-means algorithm), thus to effectively reduce the computing amount of data patching for parking lots. For the sake of description, these clusters are called parking lot clusters.

In the embodiment of the invention, users mark the parking lot pairs with high spatial similarity in the collection of urban parking lots in advance. When calculating the spatial similarity probability corresponding to each parking lot cluster, the number of parking lot pairs with high spatial similarity in the same parking lot cluster is preferably obtained. The spatial similarity probability corresponding to the parking lot cluster is calculated according to the obtained number of parking lot pairs to improve the calculation accuracy of spatial similarity probability. Further preferably, the formula of the spatial similarity probability is indicated as:

$$P(S) = \frac{\sum pp_i \in U_{vs}}{C_a^2},$$

wherein, $P(S)$ is the spatial similarity probability, $U_{vs}$ is the collection composed of parking lot pairs with high spatial similarity in the collection of urban parking lots, $pp_i$ is the $i^{th}$ parking lot pair with high similarity probability in the parking lot cluster, $\Sigma pp_i \in U_{vs}$ is the number of parking lot pairs with high similarity probability in the parking lot cluster, $C_a^2$ is the number of permutation of all parking lots in the parking lot cluster, and n is the number of parking lots in the parking lot cluster.

In step S103, calculating the data similarity between two sample parking lots in the same parking lot cluster, and calculating the data similarity probability of the parking lot clusters under the similar spatial condition according to the data similarity between two sample parking lots and the spatial similarity probability corresponding to the parking lot clusters.

In the embodiment of the invention, after the spatial similarity probability corresponding to each parking lot cluster is calculated, the data similarity between two sample parking lots in the same parking lot cluster is calculated, and the data similarity probability of the parking lot clusters under the similar spatial condition is calculated according to the spatial similarity probability corresponding to the parking lot clusters and the data similarity. Preferably, the formula of the data similarity between two sample parking lots is indicated as:

$$S_{data}(p_1, p_2) = \frac{E((d_1 - E(d_1))(d_2 - E(d_2)))}{\sqrt{D(d_1)} \sqrt{D(d_2)}},$$

wherein, $S_{data}(p_1, p_2)$ is the data similarity between sample parking lot $p_1$ and the sample parking lot $p_2$, $d_1$ is the historical parking data of the sample parking lot $p_1$, $d_2$ is the historical parking data of the sample parking lot $p_2$, $E(\bullet)$ is the mathematical expectation, and $D(\bullet)$ is the mathematical variance.

In the embodiment of the invention, the formula of data similarity probability of the parking lot clusters under the similar spatial condition is $$P(D \mid S) = \frac{P(D, S)}{P(S)},$$

wherein, $P(DIS)$ is the data similarity probability of the parking lot clusters under the similar spatial condition, $P(S)$ is the spatial similarity probability corresponding to the parking lot clusters, and $P(D,S)$ is the joint probability of spatial similarity and data similarity corresponding to the parking lot clusters. Therefore, before calculating $P(DIS)$, $P(D,S)$ should be calculated according to the data similarity between two sample parking lots in the parking lot clusters.

When calculating the joint probability of spatial similarity and data similarity, preferably, the sample parking lots with data similarity in the parking lot cluster are obtained according to the data similarity between two sample parking lots in the parking lot cluster and the preset data similarity threshold, and the parking lots with high space similarity and data similarity in the sample parking lots with data similarity are obtained. The joint probability of spatial similarity and data similarity corresponding to the parking lot clusters is calculated according to the number of the sample parking lots with data similarity in the parking lot clusters and the number of parking lot pairs, thus to effectively improve the calculation accuracy of the joint probability. Users mark out the parking lot pairs with high spatial similarity and high data similarity in the collection of urban parking lots in advance.

Further preferably, the formula of the joint probability of spatial similarity and data similarity corresponding to the parking lot clusters is indicated as:

$$P(D, S) = \frac{\sum p_i \in U_m}{\sum p_i} \cdot \frac{\sum pp_i \in U_{spc} \cap U_{vs}}{C_m^2},$$

wherein, $U_m$ is a collection of sample parking lots with data similarity in the parking lot clusters, m is the number of sample parking lots with data similarity in the parking lot clusters, $U_{spc}$ is a collection of parking lots with high data similarity, $U_{vs}$ is a collection of parking lots with high spatial similarity, $$\frac{\sum p_i \in U_m}{\sum p_i}$$

is the proportion of sample parking lots with data similarity in the parking lot clusters, and $$\frac{\sum pp_i \in U_{spc} \cap U_{vs}}{C_m^2}$$

is the proportion of parking lot pairs with high spatial similarity and data similarity in sample parking lots with data similarity.

In step S104, patching data of the parking lots to be patched in the parking lot clusters according to the parking data of the sample parking lots in the parking lot clusters and the preset recurrent GANs when the data similarity probability under the similar spatial condition exceeds the probability threshold.

In the embodiment of the invention, recurrent GANs (RGAN) replaces the generator nets and discriminator nets with the long-short term memory on the basis of Generative Adversarial Nets (GANs). When the data similarity probability under the similar spatial condition exceeds the probability threshold, the sample parking lot with the highest spatial similarity to the parking lot to be patched in the same parking lot cluster is obtained. The data of the parking lot to be patched can be patched by inputting parking data of the sample parking lot into the recurrent GANs.

Preferably, the recurrent GANs is trained after inputting the parking data of the sample parking lots with the highest spatial similarity to the parking lots to be patched into the recurrent GANs. Since the training process of the recurrent GANs is not stable, the output of the recurrent GANs is screened with the preset Bayesian filter. The screened output of the recurrent GANs is set as the parking data of the parking lots to be patched, thus to effectively improve the accuracy of data patching for parking lots.

Further preferably, when the output of the recurrent GANs is screened with the preset Bayesian filter, the output of the recurrent GANs is mixed with the parking data of the parking lot cluster where the parking lots to be patched are, then the joint probability of spatial similarity and data similarity corresponding to the parking lot cluster after mixing is calculated. If the joint probability after mixing is not lower than the joint probability before mixing, the output of the recurrent GANs is set as the parking data of the parking lots to be patched. Otherwise, the parking data of the sample parking lots with the highest similarity to the parking lots to be patched into the recurrent GANs, thus to effectively improve the accuracy of data patching for parking lots.

In the embodiment of the invention, the invention comprises the following steps: calculating the spatial similarity between two parking lots according to the spatial characteristics and spatial similarity measurement model of parking lots in the collection of urban parking lots, clustering parking lots into different clusters according to the spatial similarity, calculating the corresponding spatial similarity probability of parking lot clusters, calculating the data similarity between two sample parking lots in the same parking lot cluster, calculating the data similarity probability of the parking lot clusters under the similar spatial condition according to the data similarity and the spatial similarity probability corresponding to the parking lot clusters, patching data of the parking lots to be patched in parking lot clusters through recurrent GANs when the data similarity probability under the similar spatial condition exceeds the probability threshold, thus to conduct accurate data patching on parking lots to be patched without relying on the prior knowledge of the parking lots to be patched, which effectively saves the economic and time costs of setting up data acquisition equipment in parking lots to be patched.

Embodiment 2

Figure 2:
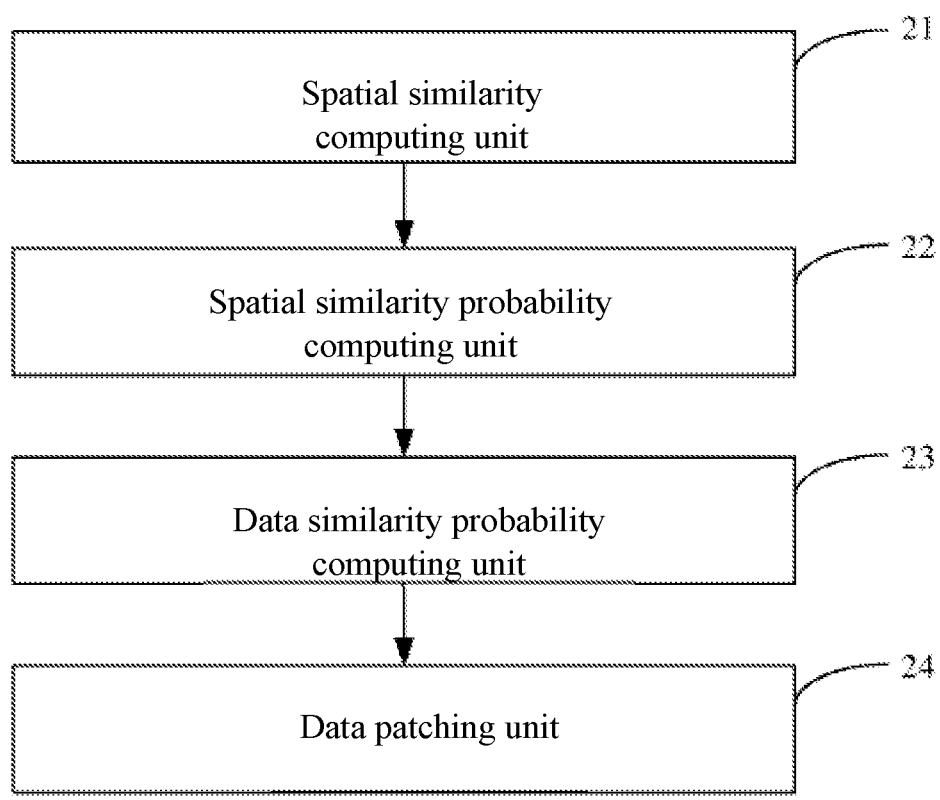
FIG. 2 is a structural diagram of the data patching device for parking lots provided in embodiment 2 of the invention.

FIG. 2 shows the structure of the data patching device for parking lots provided in embodiment 2 of the invention. For the convenience of illustration, only parts related to the embodiments of the invention are shown as follows:

Spatial similarity computing unit 21 is used to obtain a pre-collected collection of urban parking lots, calculate the spatial similarity between two parking lots according to the spatial characteristics and preset spatial similarity measurement model of each parking lot in the collection of urban parking lots. The parking lots comprises parking lots to be patched and sample parking lots.

In the embodiment of the invention, when collecting the collection of urban parking lots, the latitude and longitude of the geographic location of each parking lot and the number of each kind of preset geographic points of interest within the preset range of each parking lot in the collection of urban parking lots are collected. The spatial characteristics of a parking lot are composed of the latitude and longitude of its geographic location and the number of each kind of preset geographic points of interest within its preset range. Therefore, the subsequent calculation accuracy of spatial similarity between two parking lots can be effectively improved by considering the influence of geographical location and surrounding geographical points of interest on the parking lots.

Preferably, the preset range of a parking lot is the area with the parking lot as the center and the preset tolerance radius as the radius, which can effectively improve the subsequent calculation accuracy of spatial similarity between two parking lots. The tolerance radius is the farthest distance between the parking lot and the destination that a driver can receive.

In the embodiment of the invention, the spatial similarity between two parking lots in the collection of urban parking lots according to the spatial characteristics and preset spatial similarity measurement model of each parking lot. Preferably, the spatial similarity measurement model is indicated as:

$$S_{spatial}(p_1, p_2) = \alpha \frac{\eta_1 \cdot \eta_2}{\|\eta_1\| \cdot \|\eta_2\|} + \beta \frac{\omega_1 \cdot \omega_2}{\|\omega_1\| \cdot \|\omega_2\|},$$

wherein, $S_{spatial}(p_1, p_1)$ is the spatial similarity between the parking lot $p_1$ and the parking lot $p_2$ in the collection of urban parking lots, the spatial characteristics of the parking lots $p_1$ and $p_2$ are $(\eta_1, \omega_1)$ and $(\eta_2, \omega_2)$ respectively, $\eta_1$ and $\omega_1$ are the latitude and longitude of the geographic location of the parking lot $p_1$ and the corresponding number of geographic points of interest respectively, $\eta_2$ and $\omega_2$ are the latitude and longitude of the geographic location of the parking lot $p_2$ and the corresponding number of geographic points of interest respectively, and $\alpha$ and $\beta$ are preset influence coefficients. Thus, the spatial similarity measurement model is integrated with the influence of the latitude and longitude of the parking lot and the surrounding geographical points of interest on the spatial similarity, which effectively improve the calculation accuracy of spatial similarity.

Spatial similarity probability computing unit 22 is used to cluster the parking lots into different clusters according to the spatial similarity between two parking lots, and calculate the corresponding spatial similarity probability of each parking lot cluster.

In the embodiment of the invention, after obtaining the spatial similarity between two parking lots, all parking lots in the collection of urban parking lots can be clustered into different parking lot clusters according to these spatial similarity values and the preset clustering algorithm, thus to effectively reduce the computing amount of data patching for parking lots.

In the embodiment of the invention, users mark the parking lot pairs with high spatial similarity in the collection of urban parking lots in advance. When calculating the spatial similarity probability corresponding to each parking lot cluster, the number of parking lot pairs with high spatial similarity in the same parking lot cluster is preferably obtained. The spatial similarity probability corresponding to the parking lot cluster is calculated according to the obtained number of parking lot pairs to improve the calculation accuracy of spatial similarity probability. Further preferably, the formula of the spatial similarity probability is indicated as:

$$P(S) = \frac{\sum pp_i \in U_{vs}}{C_a^2},$$

wherein, P(S) is the spatial similarity probability, $U_{vs}$ is the collection composed of parking lot pairs with high spatial similarity in the collection of urban parking lots, $pp_i$ is the $i^{th}$ parking lot pair with high similarity probability in the parking lot cluster, $\Sigma pp_t \in U_{vs}$ is the number of parking lot pairs with high similarity probability in the parking lot cluster, $C_a^2$ is the number of permutation of all parking lots in the parking lot cluster, and n is the number of parking lots in the parking lot cluster.

Data similarity probability computing unit 23 is used to calculate the data similarity between two sample parking lots in the same parking lot cluster, and calculate the data similarity probability of the parking lot clusters under the similar spatial condition according to the data similarity between two sample parking lots and the spatial similarity probability corresponding to the parking lot clusters.

In the embodiment of the invention, after the spatial similarity probability corresponding to each parking lot cluster is calculated, the data similarity between two sample parking lots in the same parking lot cluster is calculated, and the data similarity probability of the parking lot clusters under the similar spatial condition is calculated according to the spatial similarity probability corresponding to the parking lot clusters and the data similarity. Preferably, the formula of the data similarity between two sample parking lots is indicated as:

$$S_{data}(p_1, p_2) = \frac{E((d_1 - E(d_1))(d_2 - E(d_2)))}{\sqrt{D(d_1)}\sqrt{D(d_2)}},$$

wherein, $S_{data}(p_1, p_2)$ is the data similarity between sample parking lot $p_1$ and the sample parking lot $p_2$, $d_1$ is the historical parking data of the sample parking lot $p_1$, $d_2$ is the historical parking data of the sample parking lot $p_2$, $E(\cdot)$ is the mathematical expectation, and $D(\cdot)$ is the mathematical variance.

In the embodiment of the invention, the formula of data similarity probability of the parking lot clusters under the similar spatial condition is $$P(D \mid S) = \frac{P(D, S)}{P(S)},$$

wherein, P(DIS) is the data similarity probability of the parking lot clusters under the similar spatial condition, P(S) is the spatial similarity probability corresponding to the parking lot clusters, and P(D,S) is the joint probability of spatial similarity and data similarity corresponding to the parking lot clusters. Therefore, before calculating P(DIS), P(D,S) should be calculated according to the data similarity between two sample parking lots in the parking lot clusters.

When calculating the joint probability of spatial similarity and data similarity, preferably, the sample parking lots with data similarity in the parking lot cluster are obtained according to the data similarity between two sample parking lots in the parking lot cluster and the preset data similarity threshold, and the parking lots with high space similarity and data similarity in the sample parking lots with data similarity are obtained. The joint probability of spatial similarity and data similarity corresponding to the parking lot clusters is calculated according to the number of the sample parking lots with data similarity in the parking lot clusters and the number of parking lot pairs, thus to effectively improve the calculation accuracy of the joint probability. Users mark out the parking lot pairs with high spatial similarity and high data similarity in the collection of urban parking lots in advance.

Further preferably, the formula of the joint probability of spatial similarity and data similarity corresponding to the parking lot clusters is indicated as:

$$P(D, S) = \frac{\sum p_i \in U_m}{\sum p_i} \cdot \frac{\sum pp_i \in U_{spc} \cap U_{vs}}{C_m^2},$$

wherein, $U_m$ is a collection of sample parking lots with data similarity in the parking lot clusters, m is the number of sample parking lots with data similarity in the parking lot clusters, $U_{spc}$ is a collection of parking lots with high data similarity, $U_{vs}$ is a collection of parking lots with high spatial similarity, $$\frac{\sum p_i \in U_m}{\sum p_i}$$

is the proportion of sample parking lots with data similarity in the parking lot clusters, and $$\frac{\sum pp_i \in U_{spc} \cap U_{vs}}{C_m^2}$$

is the proportion of parking lot pairs with high spatial similarity and data similarity in sample parking lots with data similarity.

Data patching unit 24 is used to patch data of the parking lots to be patched in the parking lot clusters according to the parking data of the sample parking lots in the parking lot clusters and the preset recurrent GANs when the data similarity probability under the similar spatial condition exceeds the probability threshold.

In the embodiment of the invention, when the data similarity probability under the similar spatial condition exceeds the probability threshold, the sample parking lot with the highest spatial similarity to the parking lot to be patched in the same parking lot cluster is obtained. The data of the parking lot to be patched can be patched by inputting parking data of the sample parking lot into the recurrent GANs.

Preferably, the recurrent GANs is trained after inputting the parking data of the sample parking lots with the highest spatial similarity to the parking lots to be patched into the recurrent GANs. Since the training process of the recurrent GANs is not stable, the output of the recurrent GANs is screened with the preset Bayesian filter. The screened output of the recurrent GANs is set as the parking data of the parking lots to be patched, thus to effectively improve the accuracy of data patching for parking lots.

Further preferably, when the output of the recurrent GANs is screened with the preset Bayesian filter, the output of the recurrent GANs is mixed with the parking data of the parking lot cluster where the parking lots to be patched are, then the joint probability of spatial similarity and data similarity corresponding to the parking lot cluster after mixing is calculated. If the joint probability after mixing is not lower than the joint probability before mixing, the output of the recurrent GANs is set as the parking data of the parking lots to be patched. Otherwise, the parking data of the sample parking lots with the highest similarity to the parking lots to be patched into the recurrent GANs, thus to effectively improve the accuracy of data patching for parking lots.

Figure 3:
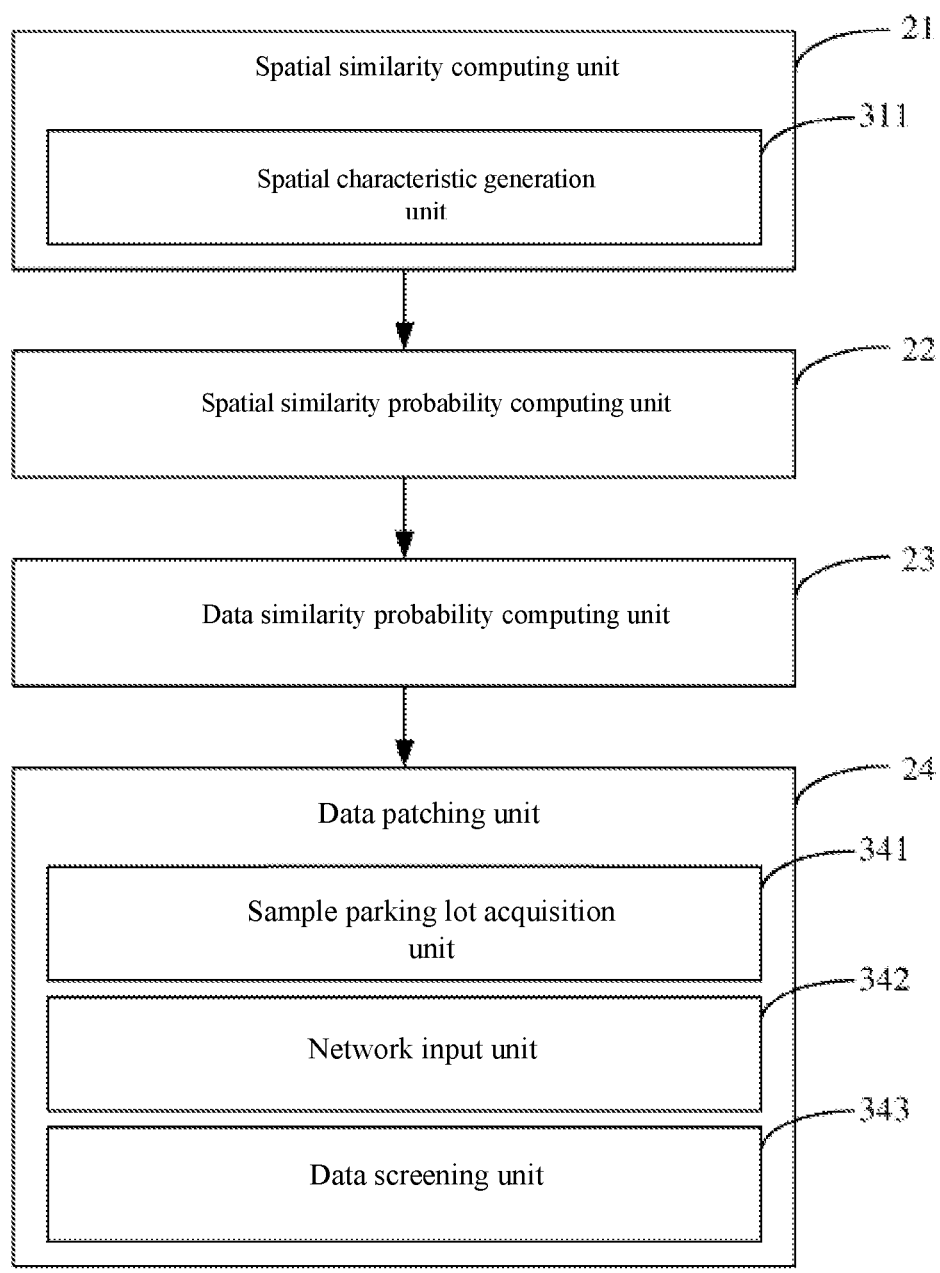
FIG. 3 is an optimal structural diagram the data patching device for parking lots provided in embodiment 2 of the invention.

Preferably, as shown in FIG. 3, spatial similarity computing unit 21 comprises:

Spatial characteristic generation unit 311 is used to generate the spatial characteristics of each parking lot according to the latitude and longitude of its geographic location and the number of each kind of preset geographic points of interest within the preset range of each parking lot.

Preferably, data patching unit 24 comprises:

Sample parking lot acquisition unit 341 is used to obtain the sample parking lots with the highest similarity to the parking lots to be patched in the same parking lot cluster;

Network input unit 342 is used to input the parking data of the sample parking lots with the highest spatial similarity into the recurrent GANs; and Data screening unit 343 is used to screen the output of the recurrent GANs with the preset Bayesian filter to obtain the parking data of parking lots to be patched.

In the embodiment of the invention, the invention comprises the following steps: calculating the spatial similarity between two parking lots according to the spatial characteristics and spatial similarity measurement model of parking lots in the collection of urban parking lots, clustering parking lots into different clusters according to the spatial similarity, calculating the corresponding spatial similarity probability of parking lot clusters, calculating the data similarity between two sample parking lots in the same parking lot cluster, calculating the data similarity probability of the parking lot clusters under the similar spatial condition according to the data similarity and the spatial similarity probability corresponding to the parking lot clusters, patching data of the parking lots to be patched in parking lot clusters through recurrent GANs when the data similarity probability under the similar spatial condition exceeds the probability threshold, thus to conduct accurate data patching on parking lots to be patched without relying on the prior knowledge of the parking lots to be patched, which effectively saves the economic and time costs of setting up data acquisition equipment in parking lots to be patched.

In the embodiment of the invention, each unit of the data patching device for parking lots can be realized by corresponding hardware or software unit. Each unit may be an independent software or hardware unit, or a integrated software and hardware unit, which shall not be used to limit the invention.

Embodiment 3

Figure 4:
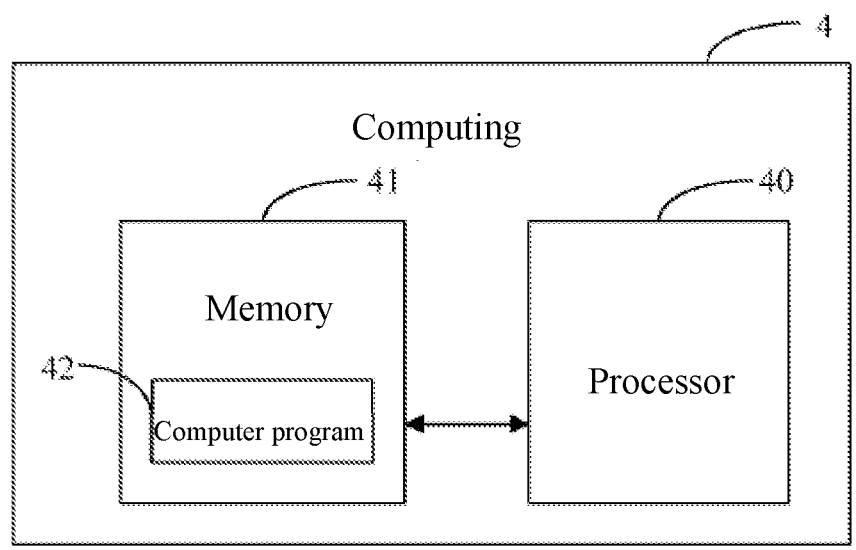
FIG. 4 is the structure diagram of the computing equipment provided in embodiment 3 of the invention.

FIG. 4 shows the structure of the computing equipment provided in embodiment 3 of the invention. For the convenience of illustration, only parts related to the embodiments of the invention are shown.

The computing equipment 4 in the embodiment of the invention comprises a processor 40, a memory 41, and a computer program 42 stored in the memory 41 and capable of running on the processor 40. The processor 40 executes the computer program 42 to implement the steps in the aforesaid embodiment of the method, such as steps S101 to S104 shown in FIG. 1. Or, the processor 40 executes the computer program 42 to implement the functions of the units in the aforesaid embodiment of the device, such as functions of units 21 to 24 shown in FIG. 2.

In the embodiment of the invention, the invention comprises the following steps: calculating the spatial similarity between two parking lots according to the spatial characteristics and spatial similarity measurement model of parking lots in the collection of urban parking lots, clustering parking lots into different clusters according to the spatial similarity, calculating the corresponding spatial similarity probability of parking lot clusters, calculating the data similarity between two sample parking lots in the same parking lot cluster, calculating the data similarity probability of the parking lot clusters under the similar spatial condition according to the data similarity and the spatial similarity probability corresponding to the parking lot clusters, patching data of the parking lots to be patched in parking lot clusters through recurrent GANs when the data similarity probability under the similar spatial condition exceeds the probability threshold, thus to conduct accurate data patching on parking lots to be patched without relying on the prior knowledge of the parking lots to be patched, which effectively saves the economic and time costs of setting up data acquisition equipment in parking lots to be patched.

Embodiment 4

The embodiment of the invention provides a computer readable storage medium which stores a computer program, which stores a computer program, which is executed by the processor to implement steps in the aforesaid embodiment of the method, such as, steps S101 to S104 shown in FIG. 1. Or, the computer program is executed by the processor to implement the functions of the units in the aforesaid embodiment of the device, such as functions of units 21 to 24 shown in FIG. 2.

In the embodiment of the invention, the invention comprises the following steps: calculating the spatial similarity between two parking lots according to the spatial characteristics and spatial similarity measurement model of parking lots in the collection of urban parking lots, clustering parking lots into different clusters according to the spatial similarity, calculating the corresponding spatial similarity probability of parking lot clusters, calculating the data similarity between two sample parking lots in the same parking lot cluster, calculating the data similarity probability of the parking lot clusters under the similar spatial condition according to the data similarity and the spatial similarity probability corresponding to the parking lot clusters, patching data of the parking lots to be patched in parking lot clusters through recurrent GANs when the data similarity probability under the similar spatial condition exceeds the probability threshold, thus to conduct accurate data patching on parking lots to be patched without relying on the prior knowledge of the parking lots to be patched, which effectively saves the economic and time costs of setting up data acquisition equipment in parking lots to be patched.

The computer readable storage medium in the embodiment of the invention may include any entity or device capable of carrying computer program code, or recording medium, such as ROM/RAM, disk, optical disk and flash memory, etc.

The above description is only an embodiment of the present invention; it is not intended to limit the scope of the invention. Any patching, equivalent substitution and improvement with the spirit and principle of this invention shall be included in the scope of protection of the invention.

The invention claimed is:

1. A method of patching data for parking lots, comprising following steps:
    obtaining a pre-collected collection of urban parking lots,
    calculating a spatial similarity between two parking lots according to a preset spatial similarity measurement model and spatial characteristics of each parking lot in the said collection of urban parking lots,
    wherein the parking lots comprise to-be-patched parking lots and sample parking lots;
    clustering the parking lots into different clusters according to the spatial similarity between two parking lots, and calculating a spatial similarity probability corresponding to each parking lot cluster;
    calculating a data similarity between two sample parking lots in the same parking lot cluster,
    calculating a data similarity probability of a parking lot cluster under similar spatial condition, according to the data similarity between two sample parking lots and the spatial similarity probability corresponding to the parking lot cluster;
    when the data similarity probability of the parking lot cluster under similar spatial condition exceeds a probability threshold, patching data of a to-be-patched parking lot in the parking lot cluster, according to parking data of the sample parking lots in the parking lot cluster and a preset recurrent Generative Adversarial Nets (GANs).

2. The method of claim 1, wherein the step of calculating the spatial similarity between two parking lots comprises:
    generating the spatial characteristics of each parking lot according to the latitude and longitude of its geographic location and according to the number of each type of preset geographic interest points within a preset range around each parking lot.

3. A non-transitory computer readable storage medium for storing a computer program, wherein said method of claim 2 is implemented when said computer program is executed by a processor.

4. The method of claim 2, wherein the spatial similarity measurement model comprises:

$$S_{spatial}(p_1, p_2) = \alpha \frac{\eta_1 \cdot \eta_2}{\|\eta_1\| \cdot \|\eta_2\|} + \beta \frac{\omega_1 \cdot \omega_2}{\|\omega_1\| \cdot \|\omega_2\|},$$

wherein, $S_{spatial}(p_1, p_1)$ is the spatial similarity between a parking lot $p_1$ and a parking lot $p_2$, $\eta_1$ and $\omega_1$ are the latitude and longitude of the geographic location of the parking lot $p_1$ and the corresponding number of geographic interest points respectively, $\eta_2$ and $\omega_2$ are the latitude and longitude of the geographic location of the parking lot $p_2$ and the corresponding number of geographic interest points respectively, and the $\alpha$ and $\beta$ are preset influence coefficients.

5. A computing equipment comprising a memory, a processor, and a computer program stored in said memory and capable of running on said processor, wherein said method of claim 4 is implemented when said processor executes said computer program.

6. A non-transitory computer readable storage medium for storing a computer program, wherein said method of claim 4 is implemented when said computer program is executed by a processor.

7. A computing equipment comprising a memory, a processor, and a computer program stored in said memory and capable of running on said processor, wherein said method of claim 2 is implemented when said processor executes said computer program.

8. The method of claim 1, wherein the step of calculating the spatial similarity probability corresponding to each parking lot cluster comprise:
    obtaining the number of parking lot pairs in the parking lot cluster, wherein the parking lot pairs with high spatial similarity in the collection of urban parking lots is marked by users in advance;
    calculating the spatial similarity probability corresponding to the parking lot cluster according to the number of the parking lot pairs in the parking lot cluster.

9. A computing equipment comprising a memory, a processor, and a computer program stored in said memory and capable of running on said processor, wherein said method of claim 8 is implemented when said processor executes said computer program.

10. A non-transitory computer readable storage medium for storing a computer program, wherein said method of claim 8 is implemented when said computer program is executed by a processor.

11. The method of claim 1, wherein the step of patching data of a to-be-patched parking lot in the parking lot cluster according to parking data of the sample parking lots in the parking lot cluster and a preset recurrent GANs comprises:
    obtaining a sample parking lot with the highest similarity to the to-be-patched parking lot in the same parking lot cluster;
    inputting the parking data of the sample parking lot with the highest spatial similarity into the said recurrent GANs;
    screening the output of the said recurrent GANs with a preset Bayesian filter, to obtain the parking data of the to-be-patched parking lot.

12. A computing equipment comprising a memory, a processor, and a computer program stored in said memory and capable of running on said processor, wherein said method of claim 11 is implemented when said processor executes said computer program.

13. A non-transitory computer readable storage medium for storing a computer program, wherein said method of claim 11 is implemented when said computer program is executed by a processor.

14. A computing equipment comprising a memory, a processor, and a computer program stored in said memory and capable of running on said processor, wherein said method of claim 1 is implemented when said processor executes said computer program.

15. A non-transitory computer readable storage medium for storing a computer program, wherein said method of claim 1 is implemented when said computer program is executed by a processor.

16. A data patching device for parking lots, wherein the device comprises:
    spatial similarity computing unit, configured to obtain a pre-collected collection of urban parking lots, calculate a spatial similarity between two parking lots according to a preset spatial similarity measurement model and spatial characteristics of each parking lot in the said collection of urban parking lots, wherein the parking lots comprise to-be-patched parking lots and sample parking lots;

spatial similarity probability computing unit, configured to cluster the parking lots into different clusters according to the spatial similarity between two parking lots, and calculate a spatial similarity probability corresponding to each parking lot cluster;

data similarity probability computing unit, configured to calculate a data similarity between two sample parking lots in the same parking lot cluster, and calculate a data similarity probability of a parking lot cluster under similar spatial condition according to the data similarity between two sample parking lots and the spatial similarity probability corresponding to the parking lot cluster; and data patching unit, configured to patch data of a to-be-patched parking lot in the parking lot cluster according to the parking data of the sample parking lots in the parking lot cluster and a preset recurrent GANs, when the data similarity probability of the parking lot cluster under similar spatial condition exceeds a probability threshold.

17. The device of claim 16, wherein the spatial similarity computing unit comprises:

a spatial characteristic generation unit configured to generate the spatial characteristics of each parking lot according to the latitude and longitude of its geographic location and according to the number of each type of preset geographic interest points within a preset range around each parking lot.

18. The device of claim 16, wherein the data patching unit comprises:

a sample parking lot acquisition unit configured to obtain a sample parking lot with the highest similarity to the to-be-patched parking lot in the same parking lot cluster;

a network input unit configured to input the parking data of the sample parking lot with the highest spatial similarity into the recurrent GANs; and a data screening unit configured to screen the output of the said recurrent GANs with a preset Bayesian filter to obtain the parking data of the to-be-patched parking lot.

\* \* \* \* \*